(12) United States Patent
Haque

(10) Patent No.: US 10,904,038 B1
(45) Date of Patent: Jan. 26, 2021

(54) MICRO-ADAPTER ARCHITECTURE FOR CLOUD NATIVE GATEWAY DEVICE

(71) Applicant: Verizon Patent and Licensing Inc., Arlington, VA (US)

(72) Inventor: Rezwanul Haque, Cumming, GA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 16/691,039

(22) Filed: Nov. 21, 2019

(51) Int. Cl.
*H04L 12/66* (2006.01)
*G06F 9/54* (2006.01)
*H04L 29/08* (2006.01)

(52) U.S. Cl.
CPC ............. *H04L 12/66* (2013.01); *G06F 9/542* (2013.01); *G06F 9/546* (2013.01); *H04L 67/10* (2013.01); *H04L 69/326* (2013.01); *H04L 69/329* (2013.01)

(58) Field of Classification Search
CPC ..... H04L 12/66; H04L 69/326; H04L 69/329; G06F 9/546; G06F 9/542
See application file for complete search history.

(56) References Cited

U.S. PATENT DOCUMENTS

| 10,148,493 | B1* | 12/2018 | Ennis, Jr. | G06F 9/541 |
| 2008/0049631 | A1* | 2/2008 | Morrill | H04L 43/065 370/250 |
| 2014/0201838 | A1* | 7/2014 | Varsanyi | G06F 21/552 726/23 |
| 2016/0219024 | A1* | 7/2016 | Verzun | H04L 9/0662 |
| 2017/0006135 | A1* | 1/2017 | Siebel | G06N 5/003 |
| 2018/0262589 | A1* | 9/2018 | Spina | G06F 9/5072 |
| 2020/0304568 | A1* | 9/2020 | Jeuk | H04L 69/161 |

* cited by examiner

*Primary Examiner* — El Hadji M Sall

(57) ABSTRACT

A method, a device, and a non-transitory storage medium are described in which a micro-adapter architecture for a device gateway service is provided. The micro-adapter architecture for a device gateway service may be included in a cloud native backend gateway. The cloud native backend gateway may include a set of adapters that are logically grouped in layers for providing device gateway services. The device gateway services may include an application layer, a device layer, and a transport layer. The device gateway services may include bounded contexts based on rules that define the application layer, the device layer, and the transport layer. The device gateway services may be microservices that are distributed within the defined layers.

20 Claims, 12 Drawing Sheets

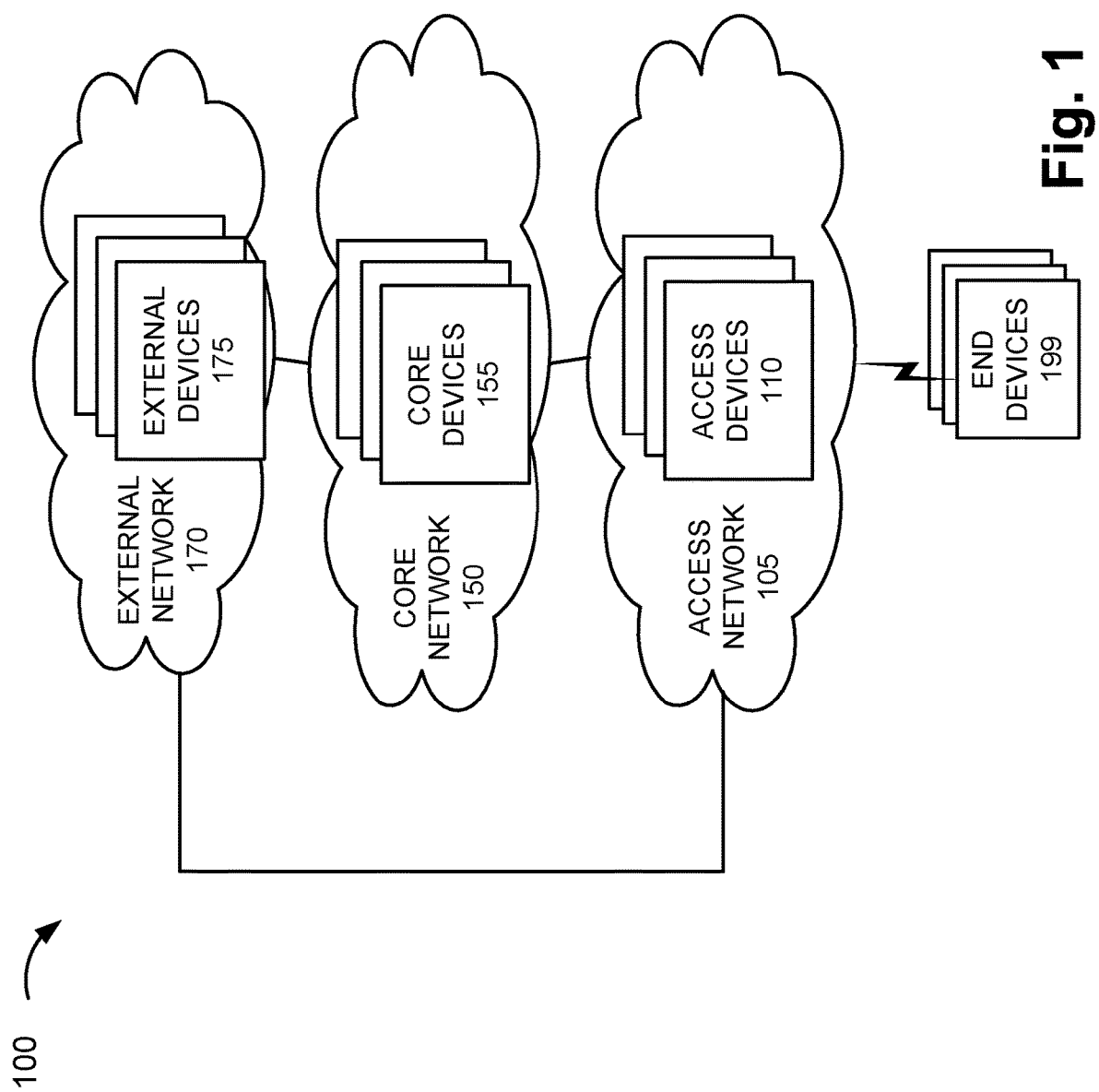

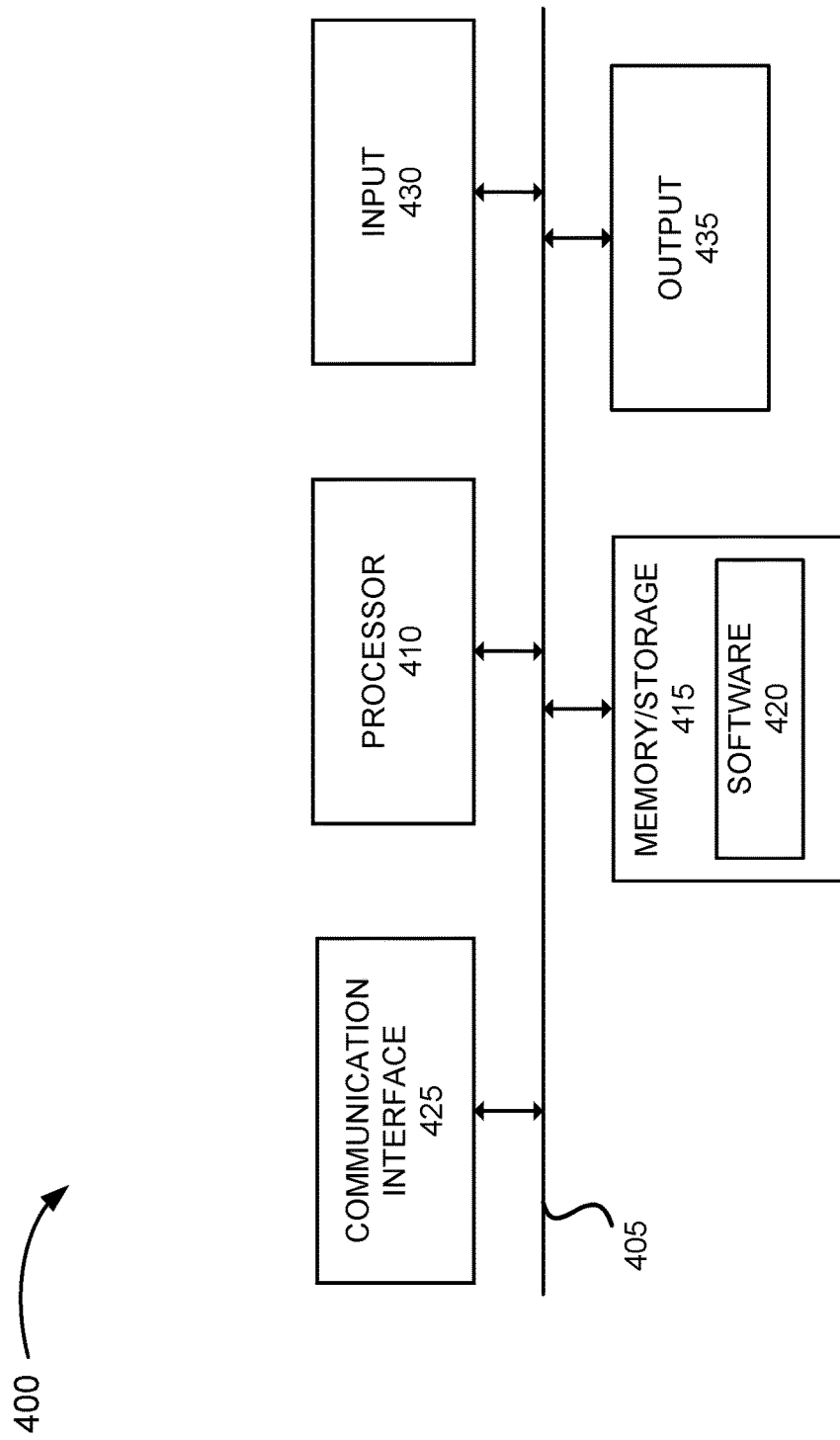

MICRO-ADAPTER ARCHITECTURE FOR CLOUD NATIVE GATEWAY DEVICE

BACKGROUND

Given the increase in the presence of Internet of Things (IoT) devices in various networks, various architectures have been used. One such architecture may include an edge gateway device (or other type of hub device) to perform various network functions, such as protocol translation, identity translation, and transparency of diversity in relation to multiple IoT devices and user applications that may be operating in different domains.

BRIEF DESCRIPTION OF THE DRAWINGS

FIG. 1 is a diagram illustrating an exemplary environment in which an exemplary embodiment of a micro-adapter architecture for a device gateway service may be implemented;

FIG. 4 is a diagram illustrating exemplary components of a device that may correspond to one or more of the devices illustrated and described herein;

DETAILED DESCRIPTION OF PREFERRED EMBODIMENTS

Figure 2A:
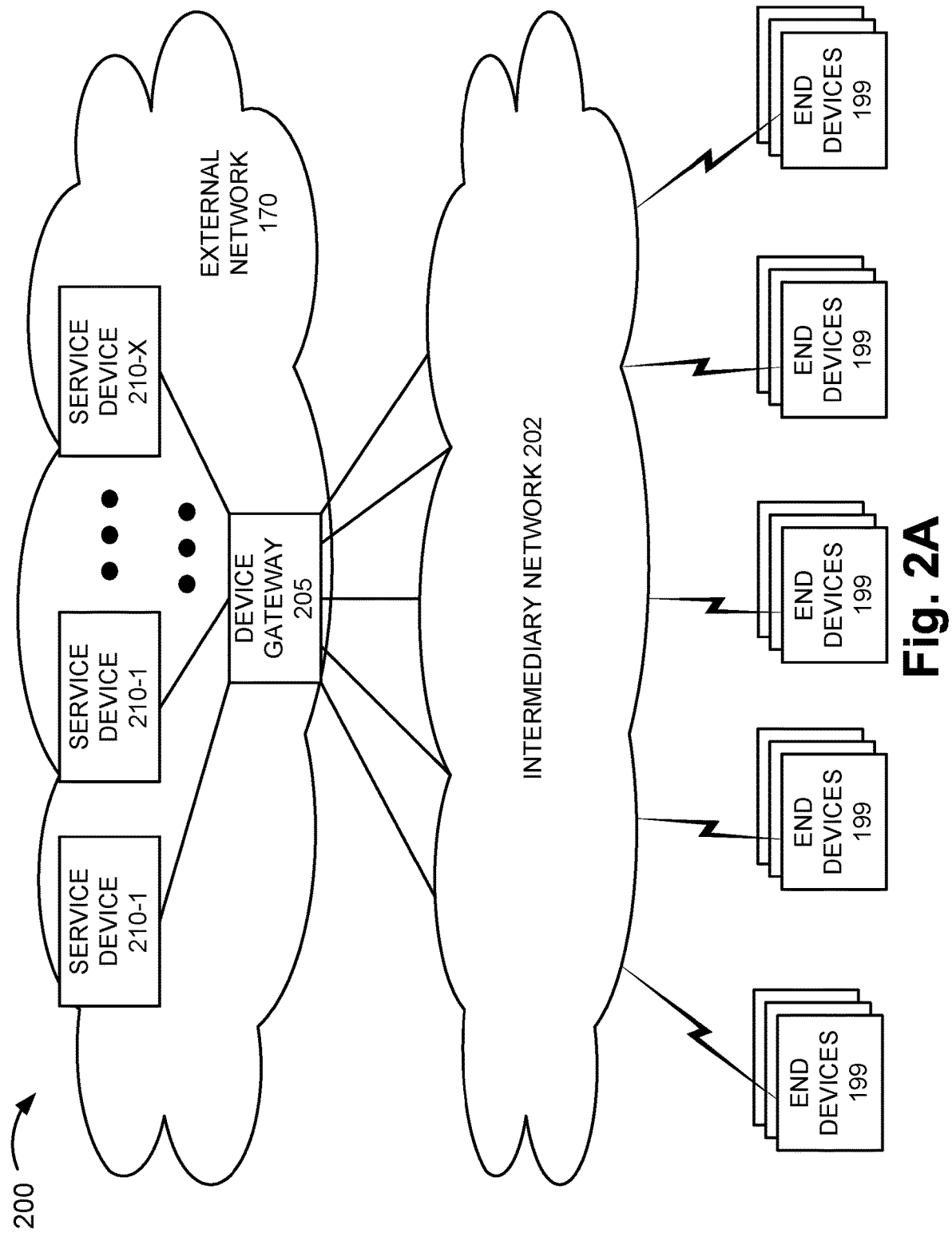
FIG. 2A is a diagram illustrating another exemplary environment in which an exemplary embodiment of a micro-adapter architecture for a device gateway service may be implemented.

The following detailed description refers to the accompanying drawings. The same reference numbers in different drawings may identify the same or similar elements. Also, the following detailed description does not limit the invention.

Edge gateways may be optimal for application domains, such as home automation where IoT devices or other types of end devices are predominately stationary or have limited mobility that are bounded to a small area, such as a home residence. In view of the nature of a home automation domain, IoT devices with different functionalities within the same geolocation may be collaborative in nature. However, in other domains, such as telematics or another type of domain, limited mobility and collaborating functionalities within the same geolocation may not be present. Rather, IoT device may be mobile within a relatively large geolocation, and may provide functions with no collaboration within the same geolocation. Additionally, in the telematics or another type of domain, events from the IoT devices may be gathered in the backend to make application decisions based on event analysis. As one example, event analysis may include calculating efficient routing for a fleet of vehicles.

According to exemplary embodiments, a micro-adapter architecture for a device gateway service is described. According to an exemplary embodiment, the micro-adapter architecture includes a set of adapters that are logically grouped in layers for providing device gateway services. According to an exemplary embodiment, the micro-adapter architecture may be deployed in a cloud-native backend device gateway. According to an exemplary embodiment, the services may include an application layer, a device layer, and a transport layer, as described herein. According to an exemplary embodiment, the services may include bounded contexts based on rules that define the layers, as described herein. According to an exemplary embodiment, the services are microservices that are distributed within the defined layers, as described herein.

FIG. 1 is a diagram illustrating an exemplary environment 100 in which an exemplary embodiment of the micro-adapter architecture for a device gateway service may be implemented. As illustrated, environment 100 includes an access network 105 a core network 150, and an external network 170. Access network 105 includes access devices 110, core network 150 includes core devices 155, and external network 170 includes external devices 175. Environment 100 further includes end devices 199.

The number, type, and arrangement of networks illustrated in environment 100 are exemplary. Additionally, or alternatively, other networks not illustrated in FIG. 1 may be included in environment 100, such as a backhaul/fronthaul network or another type of intermediary network, as described herein.

The number, the type, and the arrangement of network devices in access network 105, core network 150, external network 170, as illustrated and described, are exemplary. The number of end devices 199 is exemplary. A network device, a network element, or a network function (referred to herein simply as a network device) may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.)). Additionally, a network device may be implemented according to various computing architectures, such as centralized, distributed, cloud (e.g., elastic, public, private, etc.), edge, fog, and/or another type of computing architecture.

Environment 100 includes communication links between the networks, between network devices, and between end device 199 and network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Environment 100 may include various planes of communication including, for example, a control plane, a user plane, and a network management plane. Environment 100 may include other types of planes of communication. A message communicated in support of the micro-adapter architecture for a device gateway service may use at least one of these planes of communication. Additionally, an interface of a network device may be modified (e.g., relative to an interface defined by a standards body, such as Third Generation Partnership Project (3GPP), International Telecommunication Union (ITU), European Telecommunications Standards Institute (ETSI), etc.) or a new interface of the network device may be provided in order to support the communication (e.g., transmission and reception of messages, information elements (IE), attribute value pairs (AVPs), etc.) between network devices and the micro-adapter architecture for a device gateway service logic, as described herein. According to various exemplary implementations, the interface of the network device may be a service-based interface or a reference point-based interface.

Access network 105 may include one or multiple networks of one or multiple types and technologies. For example, access network 105 may include a Fourth Generation (4G) RAN, a 4.5G RAN, a Fifth Generation (5G) RAN, and/or another type of future generation RAN. By way of further example, access network 105 may be implemented to include an Evolved UMTS Terrestrial Radio Access Network (E-UTRAN) of a Long Term Evolution (LTE) network, an LTE-Advanced (LTE-A) network, and/or an LTE-A Pro network, a next generation (NG) RAN, and/or another type of RAN (e.g., a legacy RAN). Access network 105 may further include other types of wireless networks, such as a WiFi network, a Worldwide Interoperability for Microwave Access (WiMAX) network, a local area network (LAN), a Bluetooth network, a personal area network (PAN), or another type of network (e.g., a legacy Third Generation (3G) RAN, etc.) that may be considered a network edge. Additionally, or alternatively, access network 105 may include a wired network, an optical network, or another type of network that may provide an on-ramp to access devices 110 and/or core network 150.

According to various exemplary embodiments, access network 105 may be implemented to include various architectures of wireless service, such as, for example, macrocell, microcell, femtocell, picocell, metrocell, NR cell, LTE cell, non-cell, or another type of cell architecture. Additionally, according to various exemplary embodiments, access network 105 may be implemented according to various wireless technologies (e.g., radio access technologies (RATs), etc.), wireless standards, wireless frequencies/bands/carriers (e.g., centimeter (cm) wave, millimeter (mm) wave, below 6 Gigahertz (GHz), above 6 GHz, licensed radio spectrum, unlicensed radio spectrum, etc.), and/or other attributes of radio communication.

Depending on the implementation, access network 105 may include one or multiple types of network devices, such as access devices 110. For example, access devices 110 may include an evolved Node B (eNB), a next generation Node B (gNB), an evolved Long Term Evolution (eLTE) eNB, a radio network controller (RNC), a remote radio head (RRH), a baseband unit (BBU), a centralized unit (CU), a distributed unit (DU), a small cell node (e.g., a picocell device, a femtocell device, a microcell device, a home eNB, etc.), a future generation wireless access device, another type of wireless node (e.g., a WiFi device, a WiMax device, a hotspot device, etc.) that provides a wireless access service.

Core network 150 may include one or multiple networks of one or multiple types and technologies. According to an exemplary embodiment, core network 150 includes a complementary network of access network 105. For example, core network 150 may be implemented to include an Evolved Packet Core (EPC) of an LTE network, an LTE-A network, an LTE-A Pro network, a next generation core (NGC) network, and/or a future generation network. Core network 150 may include a legacy core network.

Depending on the implementation, core network 150 may include various types of network devices, such as core devices 155. For example, core devices 155 may include a mobility management entity (MME), a packet gateway (PGW), a serving gateway (SGW), a home agent (HA), a GPRS support node (GGSN), a home subscriber server (HSS), an authentication, authorization, and accounting (AAA) server, a policy charging and rules function (PCRF), a charging system (CS), a UPF, an access and mobility management function (AMF), a SMF, a unified data management (UDM) device, an authentication server function (AUSF), a network slice selection function (NSSF), a network repository function (NRF), a policy control function (PCF), a network data analytics function (NWDAF), a network exposure function (NEF), and/or an application function (AF). According to other exemplary implementations, core devices 155 may include additional, different, and/or fewer network devices than those described. For example, core devices 155 may include a non-standard and/or a proprietary network device, or another type of network device that may be well-known but not particularly mentioned herein. Access network 105 and/or core network 150 may include a public network and/or a private network.

External network 170 may include one or multiple networks. For example, external network 170 may be implemented to include a service or an application-layer network, the Internet, the World Wide Web (WWW), an Internet Protocol Multimedia Subsystem (IMS) network, a Rich Communication Service (RCS) network, a cloud network, a packet-switched network, a private network, a public network, or other type of network that hosts an end device application or service. According to an exemplary embodiment, external network 170 includes a cloud-native architecture that provides microservices for a cloud-native backend device gateway.

Depending on the implementation, external network 170 may include various network devices, such as external devices 175. For example, external devices 175 may provide various applications, services, or other type of end device assets, such as servers (e.g., web, application, cloud, etc.), mass storage devices, and/or data center devices. According to some exemplary implementations, the application services may pertain to IoT devices. For example, the application services may include telematic applications and/or mobile IoT applications. According to other exemplary implementations, the applications and/or services may pertain to non-IoT devices, and/or non-telematic applications.

According to an exemplary embodiment, external devices 175 include a cloud-native backend device gateway that provides the microservices, as described herein. The microservices provide functions of bounded domain contexts that are provided in a cloud environment. According to an exemplary embodiment, the cloud-native backend device gateway includes an application layer, a device layer, and a transport layer, as described herein. External devices 175 may also include network devices that provide other network-related functions, such as network management, load balancing, security, authentication and authorization, policy control, billing, and routing. External network 170 may include a private network and/or a public network.

End device 199 includes a device that has computational and wireless communicative capabilities. Depending on the implementation, end device 199 may be a mobile device, a portable device, a stationary device, a device operated by a user (e.g., user equipment (UE)), or a device not operated by a user. For example, end device 199 may be implemented as a smartphone, a mobile phone, a personal digital assistant, a tablet, a netbook, a phablet, a wearable device (e.g., a watch, glasses, etc.), a computer, a device in a vehicle, a wireless telematics device, an IoT device, or another type of mobile wireless device. End device 199 may be configured to execute various types of software (e.g., applications, programs, etc.). The number and the types of software may vary among end devices 199.

FIG. 2A is a diagram illustrating an exemplary environment 200 in which an exemplary embodiment of the microadapter architecture for a device gateway service may be implemented. As illustrated, environment 200 may include end devices 199, an intermediary network 202, and external network 170. Intermediary network 202 may include, for example, access network 105 or access network and core network 150. External network 170 may include a device gateway 205 and service devices 210-1 through 210-X (also referred to as service devices 210, and generally or individually as service device 210). According to an exemplary embodiment, external network 170 is or includes a cloud network.

Device gateway 205 includes a network device that provides the device gateway service, as described herein. According to an exemplary embodiment, device gateway 205 is a native-cloud backend gateway device. According to an exemplary embodiment, device gateway 205 includes various layers and associated bounded contexts to provide microservices of the device gateway service.

Device gateway 205 may support various end devices 199 that may be diverse in message protocol format (e.g., Hypertext Markup Language (HTML), Extensible Markup Language (XML), JavaScript Object Notation (JSON), Binary, etc.), message exchange protocol (e.g., commandresponse, wakeup-reply-job response, etc.), transport protocol, security implementation (e.g., digest calculation algorithm, encryption, certificate exchange, etc.), wireless network bandwidth, and other attributable functionalities. Device gateway 205 may support multiple IoT domains that may be diverse in their application programming interface (API) and service interface. Device gateway 205 may support different end devices 199 that may be used in the same IoT domain, and different IoT domains that may use the same end device 199.

Device gateway 205 may also facilitate a gradual introduction and device decommissioning of an IoT domain, and a rapid device introduction that allows message exchange protocol or device protocol re-use on a new transport protocol with a new security implementation. Additionally, device gateway 205 may provide traffic isolation by end device 199 in order to prevent service degradation of a particular end device 199 due to an influx of traffic pertaining to another end device 199. Also, device gateway 205 may provide traffic isolation by traffic direction in order to prevent service degradation of a particular traffic direction (e.g., inbound, outbound) due to the influx of traffic in another direction. According to an exemplary embodiment, device gateway 205 may support end devices 199 in the telematics domain (e.g., vehicular technologies, etc.). According to other exemplary embodiments, device gateway 205 may support end devices 199 in another wireless device domain that may have various diversities, as described herein. Device gateway 205 is described further below.

Service device 210 may include a network device that provides an application service for end devices 199. For example, service device 210 may provide a native cloud application in the telematics domain, a mobile IoT domain, or other domain, as described herein. As described herein, service device 210 may be configured to communicate with device gateway 205 based on a messaging system of the device gateway service. According to an exemplary embodiment, service device 210 may include an operations support system (OSS), a business support system (BSS), a middleware platform, an upperware platform, an API, and/or other logic that may provide a cloud service.

Figure 2B:
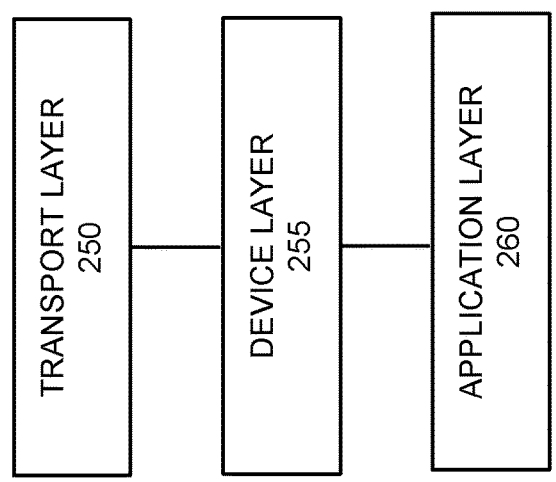
FIG. 2B is a diagram illustrating exemplary layers of an exemplary embodiment of device gateway within which native-cloud backend gateway microservices may be provided.

FIG. 2B is a diagram illustrating exemplary layers of device gateway 205 within which various native-cloud backend gateway microservices are provided. According to an exemplary embodiment, device gateway 205 includes a transport layer 250, a device layer 255, and an application layer 260. According to other exemplary embodiments, device gateway 205 may include additional or different layers. The services or microservices of a layer may be implemented as a standalone service or a library that may be deployed in a device adaptor. The context definitions, as described herein may be configurations to be used to assess a service's bounded context for its eligibility to be included in a layer of device gateway 205. According to an exemplary embodiment, transport layer 250, device layer 255, and application layer 260 may be implemented in a distributed fashion in a cloud network environment. Additionally, for example, transport layer 250, device layer 255, and application layer 260 may communicate based on Inter-Process Communication (IPC).

Transport layer 250 is configured to support various communication protocols based on a specification of end device 199. For example, transport layer 250 may support Hypertext Transfer Protocol (HTTP), HTTP Secure (HTTPS), Transmission Control Protocol (TCP), User Datagram Protocol (UDP), Short Message Peer-to-Peer Protocol (SMPP), and/or other known protocols that may be associated with an application layer, a transport layer, an Internet layer, and so forth.

According to an exemplary embodiment, transport layer 250 may be configured based on context definitions. The context definitions may include a service that implements transport protocol level message processing and communication sequence (e.g., SMPP protocol for SMS communication, etc.). The context definitions may include a service attached to a specific carrier or broker to provide transport. For example, the MQ Telemetry Transport (MQTT) protocol may use a message broker to provide publish-subscribe communication with end device 199. In this regard, any service that provides these broker functionalities may fall into this transport service domain. Additionally, the context definitions may include a library that provides a server supporting a transport level protocol. For socket communication, for example, a library (e.g., Netty, etc.) may use a transport layer component but within the context of the device adapter service.

According to an exemplary embodiment, for outbound messages, the transport service of transport layer 250 may receive the payload of a transport event and perform transformation to generate a transport specific protocol message. The transport service may use the transport specific device destination to deliver the message to a remote device. For example, an SMS transport adaptor service may convert the payload of the transport event to the SMPP message, and then deliver the message to an SMS carrier server. For example, the SMS transport adaptor service may use the Mobile Station International Subscriber Directory Number (MSISDN) assigned to end device 199 to deliver the SMPP message to service device 210 via device gateway 205. Additionally, the transport service for outbound messages may send synch acknowledgements back to the device service of device layer 255, as described herein.

According to an exemplary embodiment, for inbound messages, the transport service of transport layer 250 may receive a message for reasons that include a response to a command, a response to a wakeup, an acknowledgement of a command received, a monitoring alert trigger, or end device 199 generated event trigger which was not configure monitoring. The transport service may listen to a specific protocol associated with end device 199. Additionally, the transport service may extract the payload from the transport-specific protocol and build a transport event. The transport service may also gather context information from end device configuration information when a message is received and from the message itself. The transport service may populate information in appropriate fields of the transport event. The transport service may route the transport event to the device service of device layer 255. For example, the transport service may identify the device type of end device 199 from the context information that may be gathered from the end device configuration information of the transport.

Device layer 255 is configured to provide functionalities including authentication, device specific protocol and message transformation, message payload encryption, decryption, encoding, decoding, and device specific communication flow.

According to an exemplary embodiment, device layer 255 may be configured based on context definitions. The context definitions may include a service that implements logic to invoke a particular type of end device functionality. For example, different end devices 199 may use different message exchange sequences to have an operation executed. For example, request and response messages or wake-up and get acknowledgement messages may be message sequences in order to have an application service operation (e.g., at end device 199 or service device 210) to be executed. In this regard, message exchange sequences for a particular end device 199 is a part of the bounded context of the device service of device layer 255.

According to an exemplary embodiment, for outbound messages, the device service of device layer 255 may, upon receiving a message from transport layer 250, execute a list of handlers, which may be determined by an application type and an operation type corresponding to the event, perform message exchange workflow steps, and/or generate/store data relating to the message exchange. The device service may generate a sequence number for a message to be sent to end device 199. The device service may also determine a message exchange sequence that should be executed for the event using application type and operation type of the event. For example, the device service may determine if a request message/procedure or a wakeup message/procedure should be sent or executed. The device service may also create a job if, for example, a command should be delivered in a batch.

After an event has been processed by application handlers, the device service may execute a sequence of transformation steps that may generate a transport event. For example, for an end device that provides a remote start of a vehicle service, a series of steps may include an ATP protocol message transformation, a digest calculation, an encryption process, and a Base64 encoding. According to another example, for an end device that provides another vehicular service (e.g., by another vehicle manufacturer), a series of steps may include an online connectivity unit (OCU) protocol message transformation, an Efficient XML Interchange (EXI) encryption process, and a Base64 encoding. The device service may send the transport event to the corresponding transport service of transport layer 250 based on a carrier type associated with the transport event.

The device service may also execute post-end device invocation steps appropriate for the end device type based on an application type and an operation type corresponding to the event. For example, for an OCU device, post wake-up delivery may start a timer to a device acknowledgement. Alternatively, for example, for an end device, the device service may indicate the request-response session status, and may send a sync acknowledgement message back to the application service (e.g., request listener service or workflow service) of application layer 260.

According to an exemplary embodiment, for inbound messages, the device service of device layer 255 may execute a sequence of transformation steps that transforms a received transform event to an application event. The application event may include a payload that is of a standardized format and that may be accepted by an upstream/upper layer application without regard to the end device type from which the event came. The transformation steps may be end device type-specific and/or transport media specific. For example, the device service may, for HTTP pertaining to a first type of end device, provide digest validation and ATP protocol transformation; for SMS, provide Base 64 decoding, decryption, digest validation, and ATP protocol transformation; for HTTP pertaining to a second type of end device, provide header vehicle identification number (VIN) validation, and ATP protocol transformation.

The device service, for inbound messages, may also, after executing a transformation procedure, may execute a handler service, which may be determined based on the application and the operation type associated with the application event that may be identified during the transformation procedure. The handler service may provide, for example, that if the event from end device 199 was due to a response to a wake-up sent by end device 199, the handler service may respond back with a pending command to be sent to end device 199. Also, for example, if the event from end device 199 was due to a response for a command sent to end device 199, the handler service may close out the device transaction session, and may determine response handler service in application layer 260 to which to route the application event. The handler service may select the response handler service based on the application and message type. Additionally, for example, if the event was due to a monitoring violation sent by end device 199, the handler service may determine the alert session handler in application layer 260 to which to route the application event. The handler service may select the alert session handler based on the application and message type. According to other examples, if the event was due to a condition of end device 199 that was not configured by a user (e.g., associated with end device 199) to monitor, the handler service may determine the notification handler service in application layer 260 to which to route the application event. The handler service may select the notification handler based on the application and message type. Also, if the event was associated to certain functions that may involve a complex workflow (e.g., beyond just a request and a response, etc., as described herein), the handler service may determine the workflow event handler service in application layer 260 to which to route the application event. The handler service may select the workflow handler based on the application and message type.

The context definitions may also include a service that implements logic to process messages from a particular type of end device 199 by transport. An end device 199, which uses a particular protocol, may have different sequences of steps to have a command ready to be transported to service device 210. For example, an end device 199 that uses the Application Transport Protocol (ATP) may also require additional encryption and digest validation steps for the messages transported over SMS in addition to messages transported via HTTPS. In this example, the encryption and digest validation steps are not a requirement for the transport protocol but may be an additional requirement placed by the original equipment manufacturer (OEM) or other entity or factor.

The context definitions may further include a service that implements logic to provide message transformation to and from end device 199. For example, device gateway 205 may resolve end device diversity from upstream application, a function request from an upper layer may be received by device layer 255 in a standardized format. The device service of device layer 255 may transform the standardized messages to and from end device 199 and the associated protocol. According to an exemplary embodiment, for outbound messaging, the device service of device layer 255 may route the transport event using a transport protocol and/or transport protocol provider association. According to an exemplary embodiment, for inbound messaging, the device service of device layer 255 may route messages that are generated based on application type, message type and action, and/or other configured criterion. The context definitions of the device service may provide different functionalities based on the particular end device 199, the transport protocol, and the direction of communication (e.g., inbound, outbound).

Application layer 260 is configured to provide functionalities including providing a homogeneous interface by routing client request to appropriate device adaptors of device layer 255, managing the execution of a session (e.g., a request-based session) that may map a device response event to the appropriate client request, providing various event processor services for inbound request from end devices 199, and managing device state management information associated with a session of the application service. For example, application layer 260 may manage (e.g., store) the device state management information pertaining to call status, which may be used by logic associated with service device 210. Application layer 260 may include an interface functionality that communicates with an upper application of service device 210. For example, the upper application (e.g., relative to the application layer of device gateway 205) may include a middleware application and/or an upperware application of the application service of service device 210.

According to an exemplary embodiment, for outbound messages, the application service of application layer 260 may publish a request event received from the upstream application (e.g., application service of service device 210) intending to invoke an end device function. The application service may request a listener service designated for processing a particular end device function category corresponding to the published request event. The application service may extract and store metadata related to the upstream request-response context, and filter the data to a standardized minimal format as a payload of a container designated as an application event. Based on the upstream application, operation and end device type, the application service may determine the next operation or procedure. For example, when for the upstream application, the operation and the end device type is a complex workflow process, the application service may provide a service within application layer 260 implementing the workflow process. The service, in turn, may determine based on the end device type, which device service to invoke in device layer 255 after executing any pre-device service steps of the workflow process. On the other hand, for example, when for the upstream application, the operation and the end device type is a request-response event or another type of non-complex event as defined by the cloud-native backend device gateway service, the application service of application layer 260 may determine based on the end device type the device service to invoke in device layer 255.

Additionally, for example, the application service of application layer 260 may execute any post-end device invocating steps according to a status in an acknowledgement from the device service of device layer 255. The application service may forward the acknowledgement to an application request listener service of application layer 260. The listener service may publish the acknowledgement event to the upstream application, which may include metadata pertaining to the corresponding request event. As an example, as described herein, a post-end device step may include starting a timer for a device acknowledgement, or notate a request-response session status.

According to an exemplary embodiment, for outbound messages, the application service of application layer 260 may provide various services for an incoming application event from end device 199 via the device service of device layer 255 based on a domain context. For example, the application service may provide a response handler service. The response handler service may query metadata associated with the corresponding request for this response application event from end device 199, and use that metadata along with the payload in the event to form a response message that may be published to the upstream/upper layer application. The publishing destination may be determined by the application and operation types associated with the response event.

The application service may also provide a notification handler service. The notification handler service may call upon other services in order to query metadata needed for upper layer services to digest the end device-generated notification. The metadata and the payload of the event may be used to generate a notification message that may be published by this notification handler service. The publishing destination may be determined by the application and operation types associated with the notification message event.

The application service may also provide an alert handler service. The alert handler service may retrieve session information associated with a violation alert in order to ensure that the session is still active. If the session is active, the alert handler service may use the metadata associated with the session along with the payload of the event to generate a notification message that may be published to the upstream/upper layer application. The publishing destination may be determined by the application and operation types associated with the alert message event. If the session is not active, the alert handler service may drop the alert message and based on the end device type, may generate a command that deactivates the monitoring and provide this command to the device service of device layer 255.

The application service may further provide an application workflow service that manages the execution of steps of a workflow based on a state of the workflow and event type. The management of the workflow may result, for example, a response to the upstream/upper layer application, invocation of a remote system, or a response back to end device 199 with application-specific parameters and associated request contexts. For example, a remote start service relating to an authentication event from end device 199 may invoke a series of steps to be performed according to a workflow, or a remote status notification event from end device 199 may generate a response event that may invoke a series of steps to be performed according to a workflow, which may include another application service (e.g., a handler service).

According to an exemplary embodiment, application layer 260 may be configured based on context definitions. The context definitions may include a service that processes requests from an application layer of service device 210. For example, application layer 260 may process requests from middleware of service device 210 or other upper application of service device 210. In this regard, for example, a service that is providing an application programming interface (API) that invokes a certain device operation may be part of application layer 260. By way of further example, there may be different APIs for device management operations (e.g., restart registration, provisioning, interrogation, configuration, etc.), remote operations (e.g., remote door lock, remote start, etc.), and alert operations (e.g., geofence, theft notification, tracking, etc.).

The context definitions may also include a service for an application that needs a special workflow that is applicable to multiple end devices 199. For example, if an end device 199 operation has a complex workflow (e.g., more than just request and response messaging) such that the state of the workflow execution has to be maintained or monitored, and the workflow is applicable even for a subset of the supported end devices 199.

The context definitions may further include a service that maintains an application session. For example, there may be end device 199 operations that particular monitoring is scheduled at end device 199 via remote operation. A violation of the monitoring may trigger an alert to the logic of a back-end system (e.g., service device 210). For example, the monitoring of a session may get out of sync between end device 199 and the backend system for various reasons (e.g., network issues, such as congestion, wireless connection, or other communication factors). The service may maintain information indicating the status of an application based on the monitoring. When a violation occurs, the service may validate the violation with the backend system. As an example, device functions like geofence, curfew, and speed alert violation may be subject to this service.

The context definitions may include a service processing inbound device generated events and generating messages for the application layer of service device 210. For example, there are end device features that may generate notification events, such as remote diagnostics, automatic crash notification, sound and alarm triggers, and/or other type of end device notifications. These notification events may be generated in different forms depending on end device 199. The services at device layer 255 may transform a notification event to a particular (standardized) message format. The services at device layer 255 may also additional data (e.g., metadata) or other types of event data that may be used to allow the logic at service device 210 and/or at end device 199 to provide the application service. According to an exemplary embodiment, for outbound messaging, the application service of application layer 260 may route the application event using an associated end device type and protocol. According to an exemplary embodiment, for inbound messaging, the application service of application layer 260 may generate a message or application event based on associated application type and message type and action. For example, the application type may correspond to the particular upper layer application, such as a remote start service, a door unlock service, a voice call service, or another service. The message type and action may correspond to a message or an action pertaining to the remote start service, the door unlock service, the voice call service, or other service. For example, the voice call service may include the exchange of multiple types of messages to establish an emergency call.

Figure 2C:
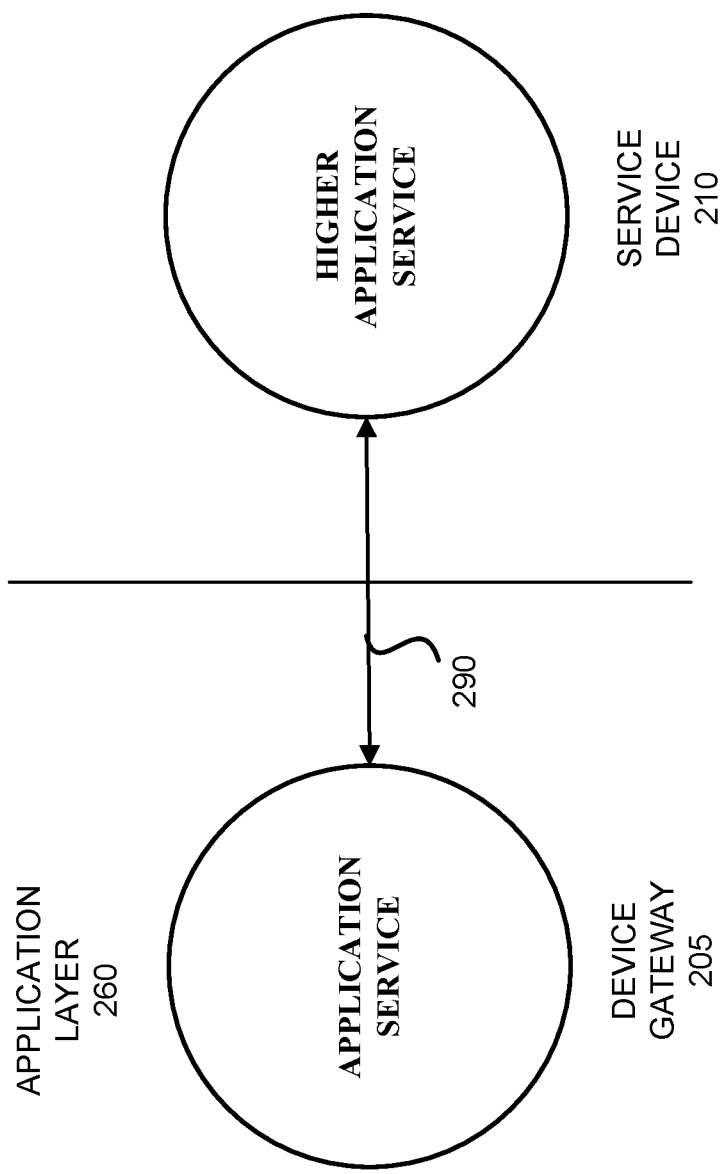
FIG. 2C is a diagram illustrating exemplary messaging between an application layer of an exemplary embodiment of the device gateway and a service device.

According to an exemplary embodiment, the application service of application layer 260 and the application service of service device 210 may communicate using a message system. For example, referring to FIG. 2C, the application service of application layer 260 of device gateway 205 may exchange messages 290 with a higher application service (e.g., middleware, upperware, etc. of an application) of service device 210. According to an exemplary embodiment, the messaging system may include a request message, an acknowledgement message, a response message, a notification message, an application event, and a transport event, as described herein.

The request message may be received by device gateway 205 from the higher application service of service device 210 sent to invoke an end device function. The acknowledgement message may be sent synchronously by device gateway 205 to the higher application service of service device 210 in response to receiving the request message. A success or a failure status of the acknowledgement message may indicate that appropriate end device command message initialization was a success or a failure. The response message may be sent asynchronously to the higher application service of service device 210 in response to receiving the request message. The response message may indicate a success in which an intended function was successfully executed at the end device, and a failure may indicate that the intended function was not successfully executed at the end device or that the end device is unreachable. The notification message may be sent asynchronously by device gateway 205 to the higher application service of service device 210 based on a notification event received from the end device in order to notify the occurrence of a scheduled or self-generated conditional event that may have occurred at the end device. For example, the conditional event may be an auto theft alarm event or a geofence violation.

The application event may be an event indicative of the application service that is used by device gateway 205 for generation and communication of a message of the messaging system. The message may include a particular payload and optionally metadata associated with the payload. The communication of the message may include routing of the message to the appropriate device (e.g., end device 199, service device 210). The transport event may be an event to or from end device 199 with a payload and optionally metadata associated with the payload included in a transport protocol specific message and associated context defined as a configuration. Depending on the direction of the message, the transport event may be transformed from or to an application event.

Figure 3:
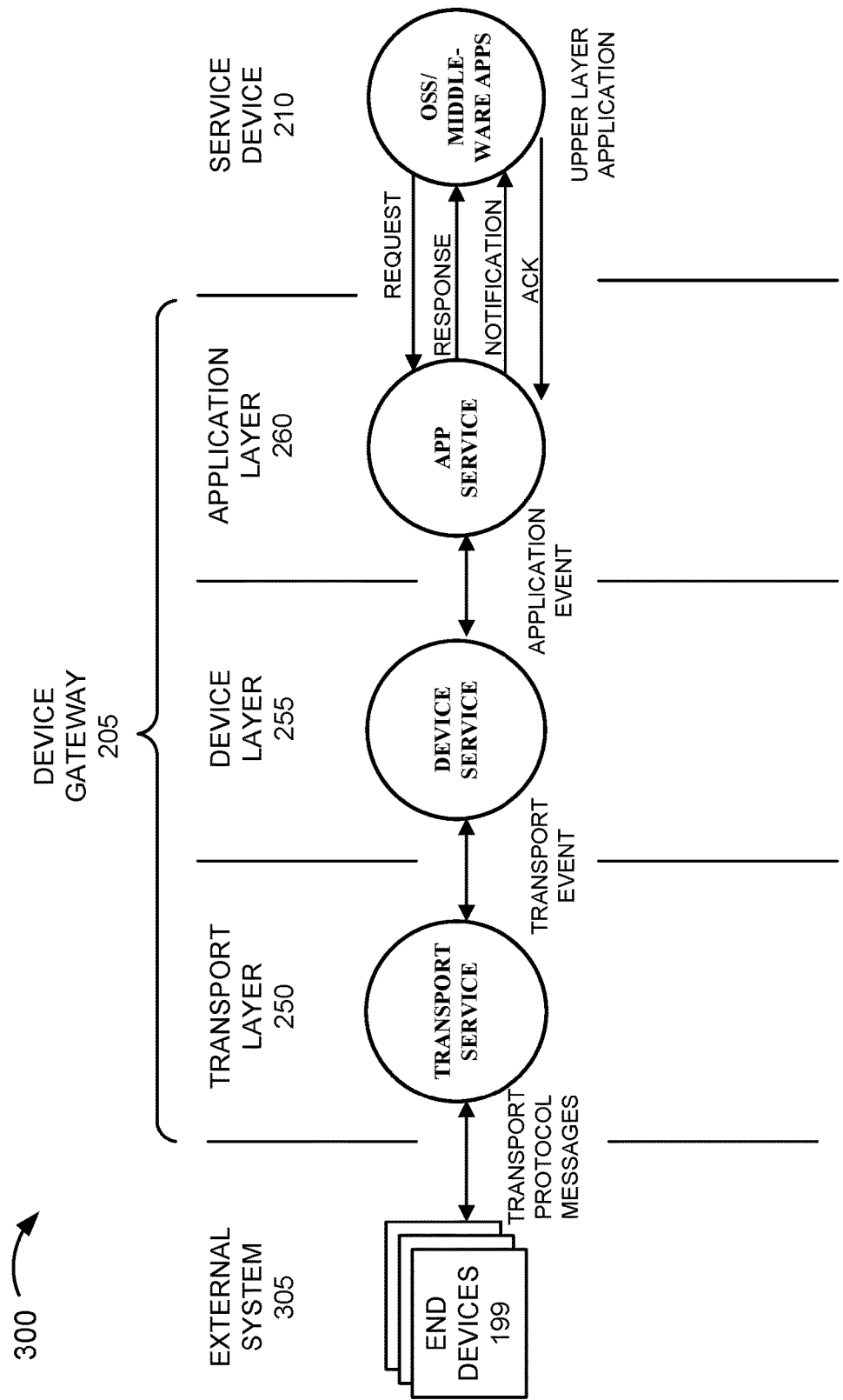
FIG. 3 is a diagram illustrating a portion of an exemplary environment consistent with the environments depicted in FIGS. 1 and 2A.

FIG. 3 is a diagram illustrating a portion of an exemplary environment 300 consistent with environments 100 and 200. For example, external system 305 may include end devices 199 and an intermediary network (not illustrated), such as access network 105 or access network 105 and core network 150. As illustrated, end devices 199 and the transport service may exchange transport protocol messages; the transport service and the device service may exchange messages based on a transport event architecture, and the device service and the application service may exchange messages based on an application event architecture, as described herein. Additionally, as further illustrated, the application service of device gateway 205 and the upper layer application service of service device 210 may use a messaging system for communication, as described.

Figure 5A:
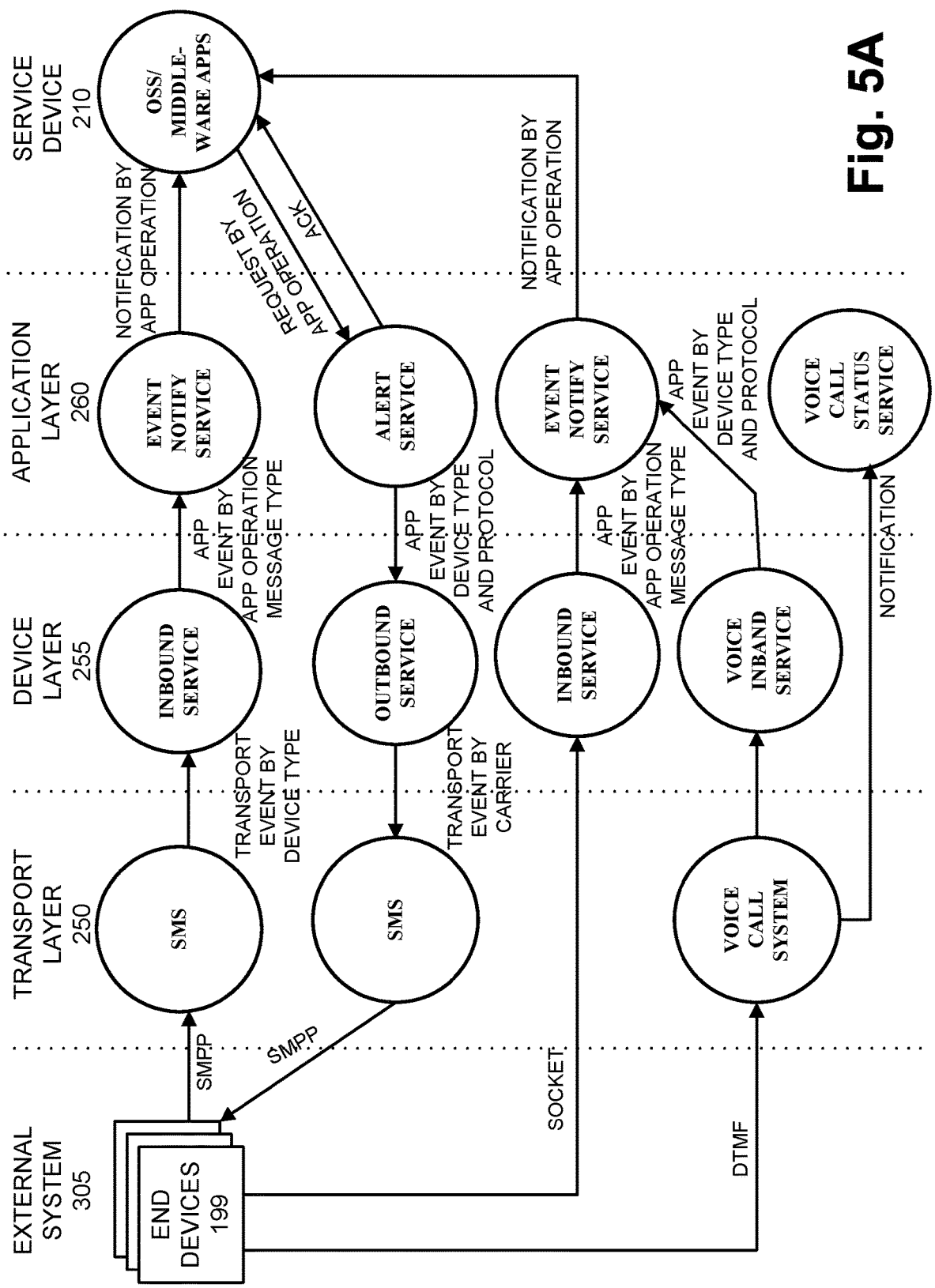
FIGS. 5A and 5B are diagrams illustrating exemplary processes of the device gateway service according to various exemplary scenarios.
Figure 5B:
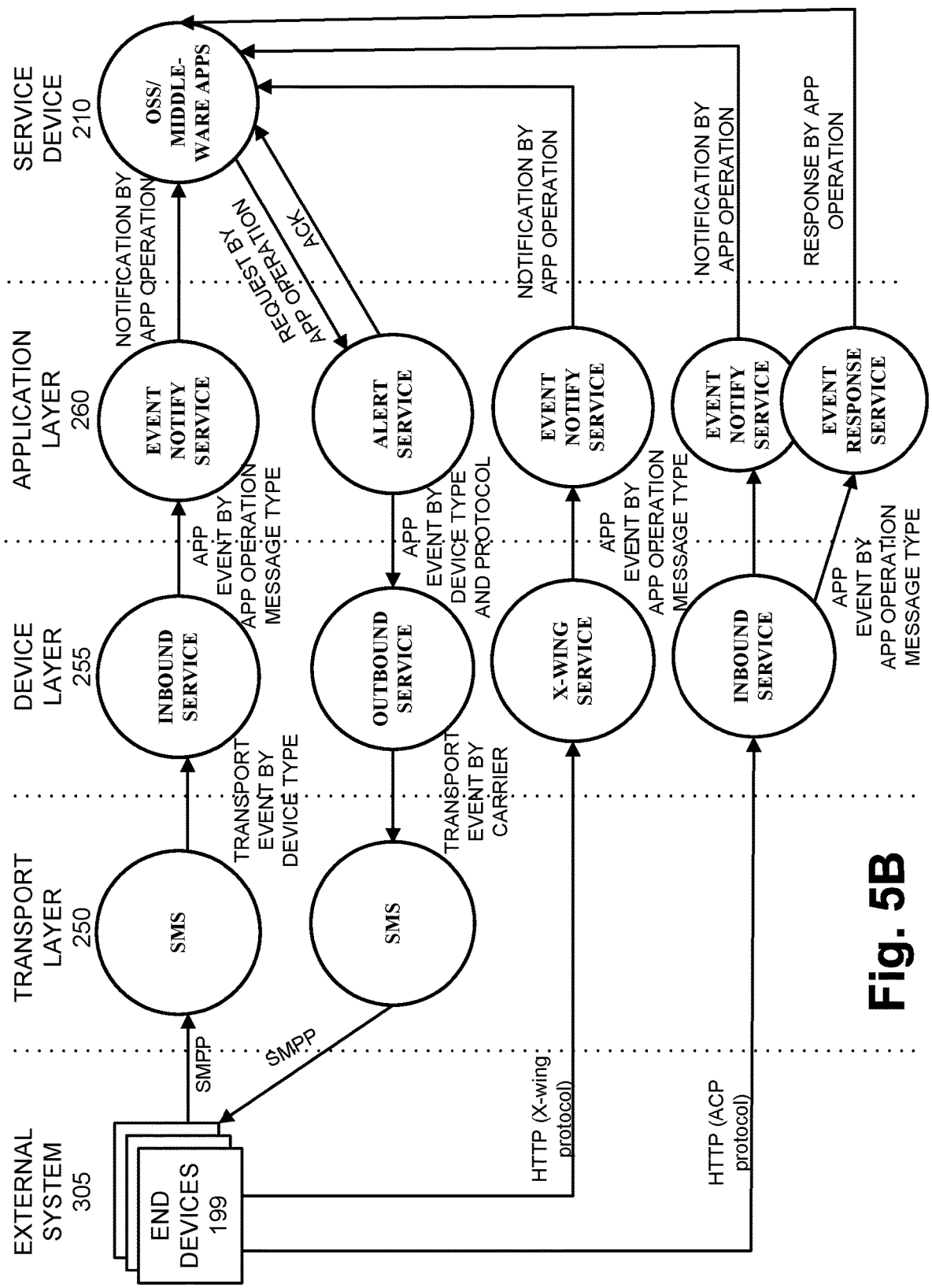

FIGS. 5A and 5B are diagrams illustrating exemplary processes of the device gateway service according to various exemplary scenarios. As illustrated in FIGS. 5A and 5B, transport layer 250, device layer 255, and application layer 260 may provide various functions, as previously described, that are based on services provided by each layer, transport and application events, and the message system. For example, in FIG. 5A, device gateway 205 may support multiple types of end devices 199 using the same device protocol and security with one transport protocol for outbound and two transport protocols for inbound. In FIG. 5B, device gateway 205 may support a single type of end device using one transport protocol for outbound, and three transport protocols for inbound in which two end device protocols may use the same transport protocol (e.g., HTTP).

FIG. 4 is a diagram illustrating exemplary components of a device 400 that may be included in one or more of the devices described herein. For example, device 400 may correspond to access devices 110, core devices 155, external devices 175, end devices 199, device gateway 205, service device 210, a layer (e.g., transport layer 250, device layer 255, application layer 260), a device adapter, and other types of network devices or logic, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to device gateway 205, software 420 may include an application that, when executed by processor 410, provides a function of the micro-adapter architecture for a device gateway service, as described herein. Additionally, for example, with reference to end device 199 and service device 210, software 420 may include an application that, when executed by processor 410, provides a function of an application service, such as a telematics service, a mobile IoT service, or another type of application service. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service based interface, etc. Communication interface 425 may be implemented for layers (e.g., transport layer 250, etc.) to include IPC logic.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in a network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process and/or a function, as described herein. Alternatively, for example, according to other implementations, device 400 performs a process and/or a function as described herein based on the execution of hardware (processor 410, etc.).

Figure 6A:
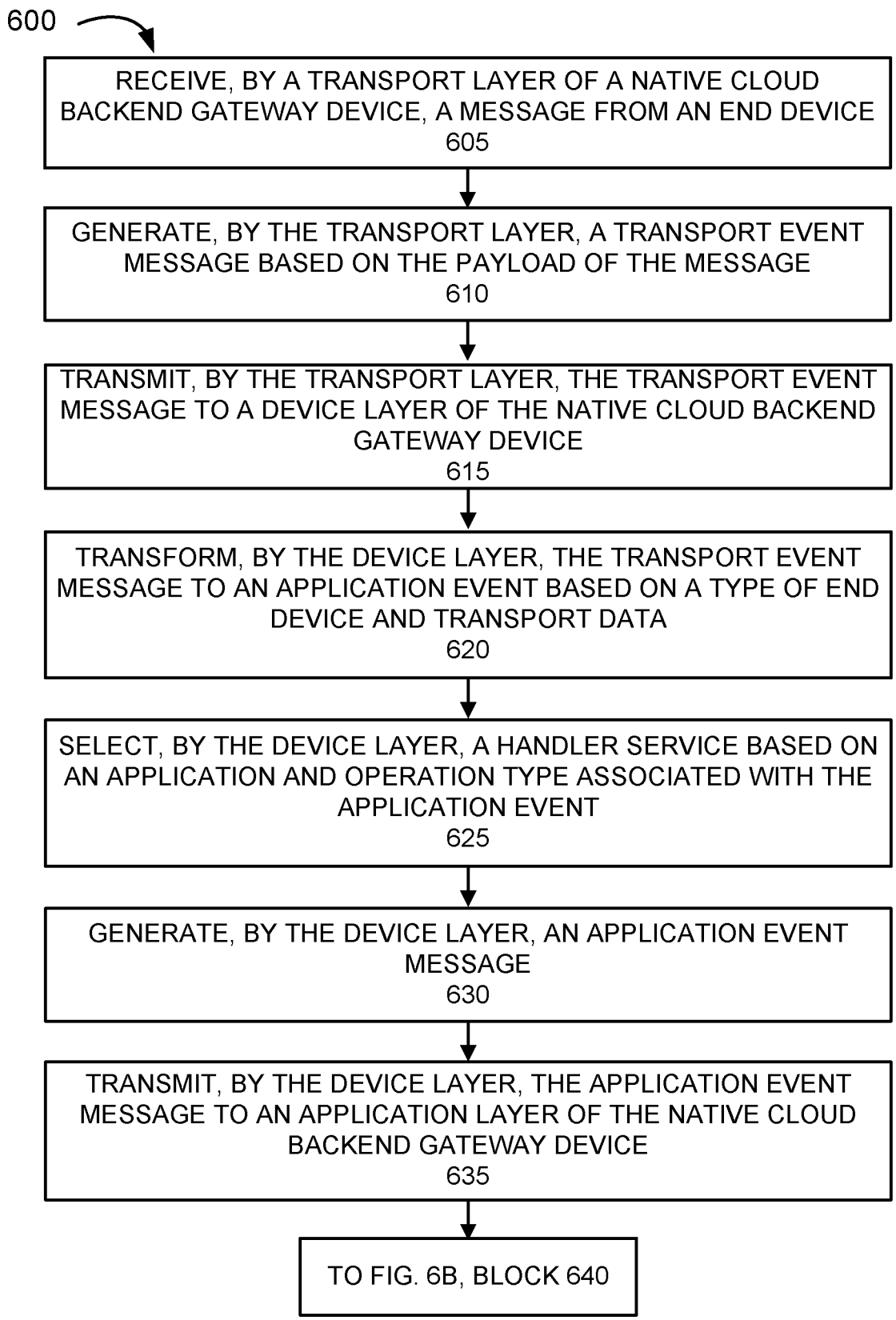
FIGS. 6A and 6B are a flow diagram illustrating an exemplary process of an exemplary embodiment of the micro-adapter architecture for a device gateway service.
Figure 6B:
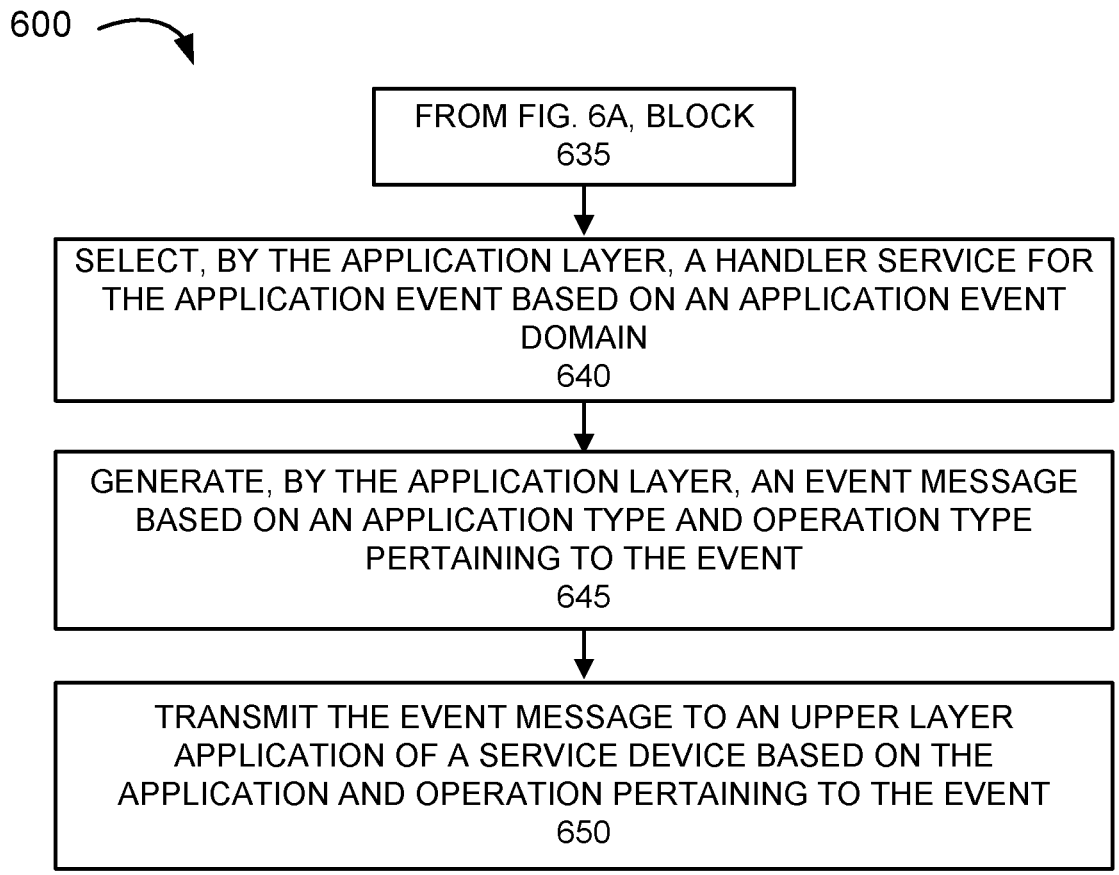

FIGS. 6A and 6B are a flow diagram illustrating an exemplary process 600 of an exemplary embodiment of the micro-adapter architecture for a device gateway service. According to an exemplary embodiment, device gateway 205 may perform steps of process 600. Process 600 may include steps performed by device gateway 205 for an inbound message. According to an exemplary implementation, processor 410 executes software 420 to perform a step illustrated in FIG. 6, and described herein. Alternatively, a step illustrated in FIG. 6 and described herein, may be performed by execution of only hardware.

Referring to FIG. 6A, in block 605, a transport layer of a native cloud backend gateway device may receive a message from an end device. For example, transport layer 250 of device gateway 205 may receive a message from end device 199. By way of further example, the message may be a response to a command or a wakeup, an acknowledgement to a command, an alert, or another type of message.

In block 610, the transport layer of the native cloud backend gateway device may generate a transport event message based on a payload of the message. For example, transport layer 250 may generate the transport event message based on the payload of the message, and other information (e.g., context information from end device 199). Transport layer 250 may populate the information into appropriate fields of a transport event. Transport layer 250 may also select a device service of device layer 255 to which to transmit the transport event message based on the end device type.

In block 615, the transport layer of the native cloud backend gateway device may transmit the transport event message to a device layer of the native cloud backend gateway device. For example, transport layer 250 may transmit the transport event message to device layer 255 of device gateway 205.

In block 620, the device layer of the native cloud backend gateway device may transform the transport event message to an application event based on the type of end device and the transport data. For example, device layer 255 may convert a payload of the transport event message pertaining to protocol, digest, decryption, and/or other aspect, as described herein, resulting in the generation of an application event.

In block 625, the device layer of the native cloud backend gateway device may select a handler service of an application layer of the native cloud backend gateway device based on an application type and an operation type associated with the application event. For example, device layer 255 may select a handler service of application layer 260 based on the associated application and operation type of the application event. By way of further example, the application type may correspond to a remote start application, and the operation type may correspond to a step or operation performed in a remote start procedure, such as communicating a start remote start message or a stop remote start message.

In block 630, the device layer of the native cloud backend gateway device may generate an application event message. For example, device layer 255 may generate an application event message that includes data resulting from the transformation, as described herein. As previously described, the transformation may be end device type specific and transport media specific.

In block 635, the device layer of the native cloud backend gateway device may transmit the application event message to an application layer of the native cloud backend gateway device. For example, device layer 255 may transmit the application event message to the appropriate handler service of application layer 260 of device gateway 205.

Referring to FIG. 6B, in block 640, the application layer of the native cloud backend gateway device may select a handler service for the application event based on an application event domain. For example, application layer 260 may select the handler service (e.g., notification, alert, response, etc.) for the application event based on the application event domain.

In block 645, the application layer of the native cloud backend gateway device may generate an event message based on an application type and an operation type pertaining to an event. For example, application layer 260 may generate an event message based on the application and operation types associated with the event.

In block 650, the application layer of the native cloud backend gateway device may transmit the event message to an upper layer application of a service device based on the application type and operation type pertaining to the event. For example, application layer 260 may transmit the event message to a higher layer application service of service device 210 based on the application and operation types pertaining to the event.

FIGS. 6A and 6B illustrate an exemplary process 600 of the micro-adapter architecture for a device gateway service, however, according to other embodiments, process 600 may include additional operations, fewer operations, and/or different operations than those illustrated in FIGS. 6A and 6B, and described herein.

Figure 7A:
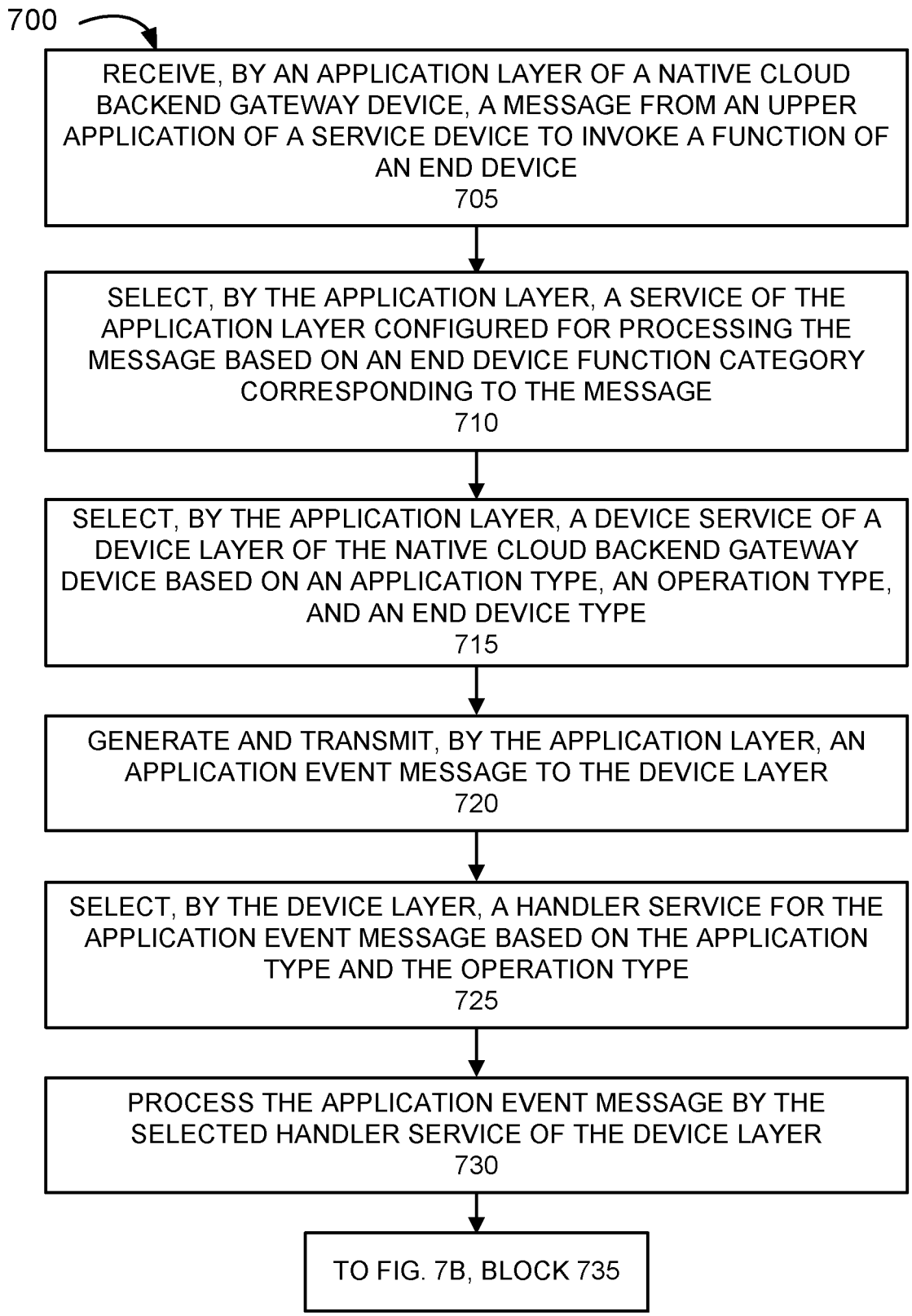
FIGS. 7A and 7B are a flow diagram illustrating another exemplary process of an exemplary embodiment of the micro-adapter architecture for a device gateway service.
Figure 7B:
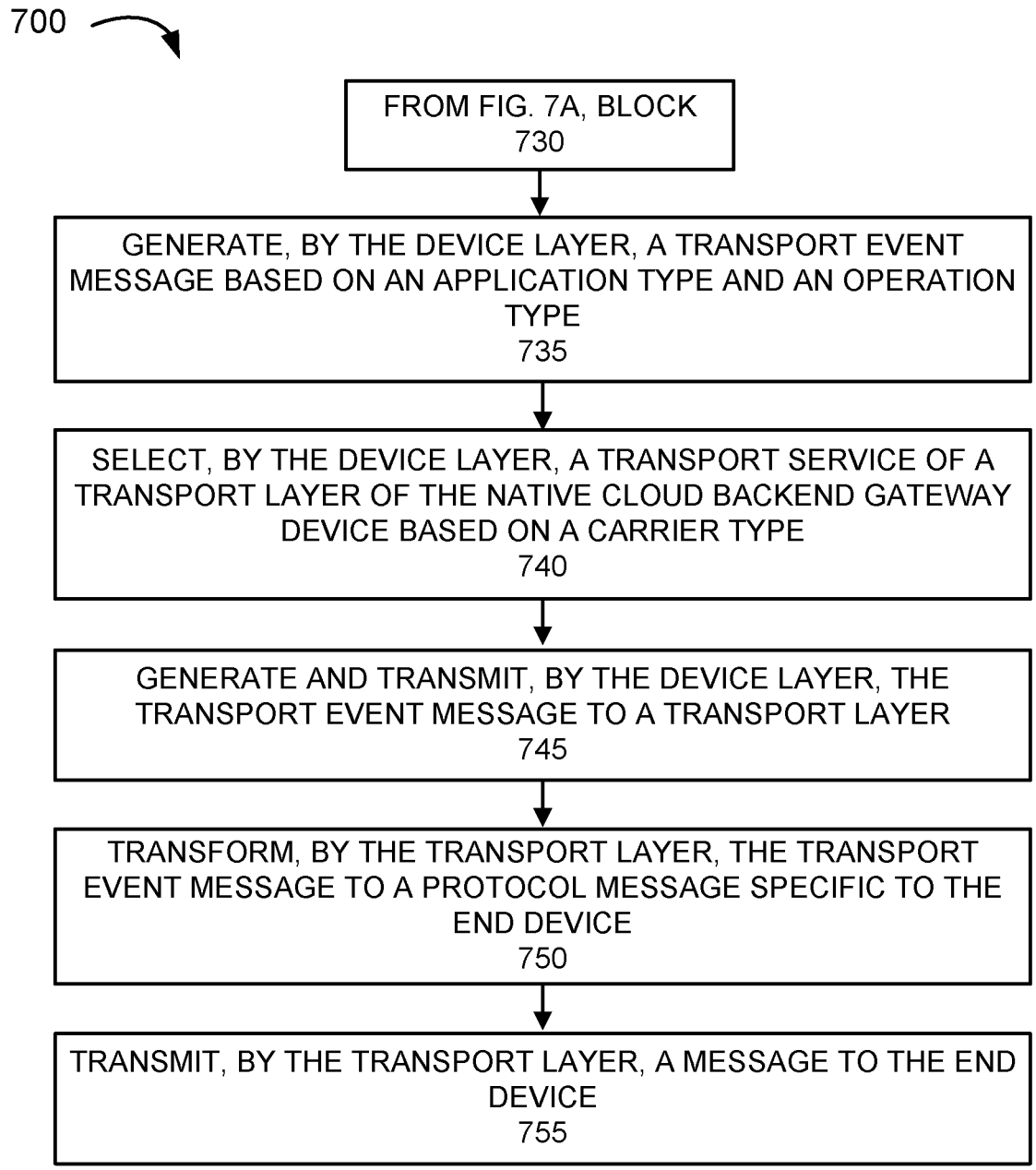

FIGS. 7A and 7B is a flow diagram illustrating yet another exemplary process 700 of an exemplary embodiment of the micro-adapter architecture for a device gateway service. According to an exemplary embodiment, device gateway 205 may perform steps of process 700. According to an exemplary implementation, processor 410 executes software 420 to perform a step illustrated in FIGS. 7A and 7B, and described herein. Alternatively, a step illustrated in FIGS. 7A and 7B and described herein, may be performed by execution of only hardware.

Referring to FIG. 7A, in block 705, an application layer of a native cloud backend gateway device may receive a message from an upper application of a service device to invoke a function of an end device. For example, application layer 260 of device gateway 205 may receive a message from the upper application (middleware, upperware, etc.) of service device 210 to invoke a function of end device 199. The message may be message (e.g., a request message) of the messaging system, as described herein.

In block 710, the application layer of the native cloud backend gateway device may select a service of the application layer for processing the message based on an end device function category corresponding to the message. For example, a request listener service of application layer 260 may extract and store data from the message as a basis to generate an application event. The request listener service may also determine, based on the application type, the operation type, and the end device type, whether the message relates to a complex workflow or a non-complex workflow (e.g., request-response procedure). For a complex workflow, the request listener service may execute some steps of the complex workflow before transmitting an application event message to device layer 255. For example, the request listener service may generate workflow data based on the execution of some of the steps of the complex workflow.

In block 715, the application layer of the native cloud backend gateway device may select a device service of a device layer of the native cloud backend gateway device based on an application type, an operation type, and an end device type. For example, the request listener service may select the appropriate device service of device layer 255 based on the application type, the operation type, the end device type, and the determined workflow.

In block 720, the application layer of the native cloud backend gateway device may generate and transmit an application event message to the device layer of the native cloud backend gateway device. For example, application layer 260 may generate and transmit the application event message to device layer 255 and the selected device service. The application event message may include a payload with a standardized format that may include data of the message and data resulting from the execution of any pre-device service invocation (e.g., workflow data) associated with a complex workflow, if any.

In block 725, the device layer of the native cloud backend gateway device may select a handler service for the application event message based on an application type and an operation type. For example, the device service of device layer 255 may select any handler services based on the application type and the operation type pertaining to the event.

In block 730, the selected handler service of the device layer may process the application event message. For example, the selected handler service may include performing message exchange workflow steps, generating and storing data relating to the message exchange (e.g., message exchange data, etc.), generating sequence numbers, and other procedures, as described herein.

Referring to FIG. 7B, in block 735, the device layer of the native cloud backend gateway device may generate a transport event message based on an application type and an operation type. For example, device layer 255 may generate a transport event message based on the application type and the operation type. The transport event message may include data resulting from the execution of a transformation procedure relating to, for example, protocol transformation, digest calculation, encryption, and/or other data transformation mechanisms, as described herein.

In block 740, the device layer of the native cloud backend gateway device may select a transport service of a transport layer of the native cloud backend gateway device based on a carrier type. For example, device layer 255 may select a transport service of transport layer 250 based on a carrier type pertaining to the transport of the service associated with service device 210.

In block 745, the device layer of the native cloud backend gateway device may generate and transmit the transport event message to the transport layer of the native cloud backend gateway device. For example, device layer 255 may generate and transmit the transport event message to transport layer 250 and the selected transport service.

In block 750, the transport layer of the native cloud backend gateway device may transform the transport event message to a protocol message specific to the end device. For example, the transport service of transport layer 250 may extract the payload of the transport event message and perform a transformation procedure that converts the payload to a protocol message suited to end device 199.

In block 755, the transport layer of the native cloud backend gateway device may transmit the message to the end device. For example, transport layer 250 may transmit the message to end device 199.

FIGS. 7A and 7B illustrate an exemplary process 700 of the micro-adapter architecture for a device gateway service, however, according to other embodiments, process 700 may include additional operations, fewer operations, and/or different operations than those illustrated in FIGS. 7A and 7B, and described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 6A, 6B, 7A, and 7B, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
  receiving, by an application layer of a native cloud backend gateway and from an upper application of a service device, a first message to invoke a function of an end device;
  executing, by the application layer, a service of the application layer to generate an application event pertaining to the first message, based on an end device function category corresponding to the first message;
  generating, by the application layer, an application event message that includes data of the application event;
  transmitting, by the application layer to a device service of a device layer of the native cloud backend gateway, the application event message;
  processing, by the device service of the device layer, the application event message;
  generating, by the device service of the device layer, a transport event message based on the processed application event message, and an application type and an operation type relating to the upper application;
  transmitting, by the device service to a transport service of a transport layer of the native cloud backend gateway, the transport event message;
  generating, by the transport service of the transport layer, a second message of a protocol relating to the end device based on the transport event message; and
  transmitting, by the transport service of the transport layer, the second message to the end device.

2. The method of claim 1, wherein the upper application provides a telematics service, and the end device is a wireless telematics device.

3. The method of claim 1, further comprising:
  selecting, by the application layer, the device service of the device layer based on an application type, an operation type, and an end device type of the end device.

4. The method of claim 1, further comprising:
  selecting, by the device service of the device layer, the transport service based on a carrier type pertaining to a transport of the upper application.

5. The method of claim 1, wherein generating of the application event message comprises:
  determining, by the service of the application layer, that the first message pertains to a complex workflow;
  generating, by the service of the application layer, workflow data based on an execution of one or more steps of the complex workflow; and
  including, by the service of the application layer, the workflow data in the application event message.

6. The method of claim 1, wherein the processing further comprises:
  performing, by the device service of the device layer, one or more message exchange workflow steps; and
  at least one of generating or storing, by the device service of the device layer, message exchange data pertaining to the one or more message exchange workflow steps.

7. The method of claim 1, wherein generating the transport event message further comprises:
  performing, by the device service of the device layer, at least one of protocol message transformation, encryption, or encoding of the processed application event message.

8. The method of claim 1, wherein generating the second message comprises:
  converting, by the transport service of the transport layer, a first payload of the transport event message to a second payload of the protocol relating to the end device.

9. A native cloud backend gateway comprising:
a communication interface;
a memory, wherein the memory stores instructions; and
a processor, wherein the processor executes the instructions to:
  receive, by an application layer of the native cloud backend gateway and from an upper application of a service device, a first message to invoke a function of an end device;
  execute, by the application layer, a service of the application layer to generate an application event pertaining to the first message, based on an end device function category corresponding to the first message;
  generate, by the application layer, an application event message that includes data of the application event;
  transmit, by the application layer to a device service of a device layer of the native cloud backend gateway, the application event message;
  process, by the device service of the device layer, the application event message;
  generate, by the device service of the device layer, a transport event message based on the processed application event message, and an application type and an operation type relating to the upper application;
  transmit, by the device service to a transport service of a transport layer of the native cloud backend gateway, the transport event message;
  generate, by the transport service of the transport layer, a second message of a protocol relating to the end device based on the transport event message; and
  transmit, by the transport service of the transport layer, the second message to the end device.

10. The native cloud backend gateway of claim 9, wherein the upper application provides a telematics service, and the end device is a wireless telematics device.

11. The native cloud backend gateway of claim 9, wherein the processor further executes the instructions to:
  select, by the application layer, the device service of the device layer based on an application type, an operation type, and an end device type of the end device.

12. The native cloud backend gateway of claim 11, wherein the processor further executes the instructions to:
  select, by the device service of the device layer, the transport service based on a carrier type pertaining to a transport of the upper application.

13. The native cloud backend gateway of claim 9, wherein the processor further executes the instructions to:
  determine, by the service of the application layer, that the first message pertains to a complex workflow;
  generate, by the service of the application layer, workflow data based on an execution of one or more steps of the complex workflow; and
  include, by the service of the application layer, the workflow data in the application event message.

14. The native cloud backend gateway of claim 9, wherein, when processing, the processor further executes the instructions to:
  perform, by the device service of the device layer, one or more message exchange workflow steps; and
  at least one of generating or storing, by the device service of the device layer, message exchange data pertaining to the one or more message exchange workflow steps.

15. The native cloud backend gateway of claim 9, wherein, when generating the transport event message, the processor further executes the instructions to:
  perform, by the device service of the device layer, at least one of protocol message transformation, encryption, or encoding of the processed application event message.

16. The native cloud backend gateway of claim 9, wherein, when generating the second message, the processor further executes the instructions to:
  convert, by the transport service of the transport layer, a first payload of the transport event message to a second payload of the protocol relating to the end device.

17. A non-transitory computer-readable storage medium storing instructions executable by a processor of a native cloud backend gateway, which when executed cause the native cloud backend gateway to:
  receive, by an application layer of the native cloud backend gateway and from an upper application of a service device, a first message to invoke a function of an end device;
  execute, by the application layer, a service of the application layer to generate an application event pertaining to the first message, based on an end device function category corresponding to the first message;
  generate, by the application layer, an application event message that includes data of the application event;
  transmit, by the application layer to a device service of a device layer of the native cloud backend gateway, the application event message;
  process, by the device service of the device layer, the application event message;
  generate, by the device service of the device layer, a transport event message based on the processed application event message, and an application type and an operation type relating to the upper application;
  transmit, by the device service to a transport service of a transport layer of the native cloud backend gateway, the transport event message;
  generate, by the transport service of the transport layer, a second message of a protocol relating to the end device based on the transport event message; and
  transmit, by the transport service of the transport layer, the second message to the end device.

18. The non-transitory computer-readable storage medium of claim 17, wherein the upper application provides a telematics service, and the end device is a wireless telematics device.

19. The non-transitory computer-readable storage medium of claim 18, wherein the instructions further comprise instructions, which when executed cause the native cloud backend gateway to:
  select, by the device service of the device layer, the transport service based on a carrier type pertaining to a transport of the upper application.

20. The non-transitory computer-readable storage medium of claim 17, wherein the instructions further comprise instructions, which when executed cause the native cloud backend gateway to:
  determine, by the service of the application layer, that the first message pertains to a complex workflow;
  generate, by the service of the application layer, workflow data based on an execution of one or more steps of the complex workflow; and
  include, by the service of the application layer, the workflow data in the application event message.

* * * * *